US010902377B2

(12) United States Patent
Murphy et al.

(10) Patent No.: US 10,902,377 B2
(45) Date of Patent: Jan. 26, 2021

(54) ROBOTIC ITEM HANDLING USING A VARIABLE AREA MANIPULATOR

(71) Applicant: Amazon Technologies, Inc., Seattle, WA (US)

(72) Inventors: Sean Murphy, Seattle, WA (US); Mark Stankiewicz, Raleigh, NC (US); Matthew Wilkie, Raleigh, NC (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 15/879,132

(22) Filed: Jan. 24, 2018

(65) Prior Publication Data

US 2019/0228371 A1 Jul. 25, 2019

(51) Int. Cl.
*G06Q 10/08* (2012.01)
*G05B 19/12* (2006.01)
(Continued)

(52) U.S. Cl.
CPC .......... *G06Q 10/087* (2013.01); *B25J 9/0096* (2013.01); *B25J 9/163* (2013.01); *B25J 9/1697* (2013.01); *B25J 13/085* (2013.01); *B25J 15/0061* (2013.01); *B25J 15/0616* (2013.01); *B25J 15/0683* (2013.01); *B65G 47/918* (2013.01); *G05B 19/124* (2013.01); (Continued)

(58) Field of Classification Search
CPC combination set(s) only.
See application file for complete search history.

(56) References Cited

U.S. PATENT DOCUMENTS 5,609,377 A * 3/1997 Tanaka ................. B65G 47/918
 294/65
9,381,645 B1 * 7/2016 Yarlagadda ............ G05B 19/42
(Continued)

FOREIGN PATENT DOCUMENTS

EP 0657373 6/1995
EP 3251996 12/2017
JP 2000127074 5/2000

OTHER PUBLICATIONS

Jonschkowski et al., "Probabilistic Multi-Class Segmentation for the Amazon Picking Challenge", Technical Report RBO-2016-01, Department of Computer Engineering and Microelectronics, Technische Universität Berlin (2016), 8 pages.
PCT/US2019/014789, "International Search Report and Written Opinion", dated Apr. 18, 2019, 18 pages.

*Primary Examiner* — Kyle O Logan
(74) *Attorney, Agent, or Firm* — Kilpatrick Townsend & Stockton LLP

(57) ABSTRACT

A manipulator can includes a frame, a first deployable support element configured to extend or retract with respect to the frame when acted on by an actuator, a static support element fixedly connected with the frame and comprising a second set of retention elements, and any suitable number of additional deployable support elements. Each support element can further include a respective set of retention elements configured to retain an item. In use, a manipulator can be used to move items by identifying an item contact area of an item to be moved, selectively deploying or retracting the deployable support elements based on the item contact area, and then contacting and retaining the item with the retention elements of the selected support elements.

18 Claims, 9 Drawing Sheets

(51) Int. Cl.
*G06K 17/00* (2006.01)
*B25J 9/00* (2006.01)
*B25J 9/16* (2006.01)
*B25J 13/08* (2006.01)
*B25J 15/06* (2006.01)
*G05B 19/402* (2006.01)
*B25J 15/00* (2006.01)
*B65G 47/91* (2006.01)

(52) U.S. Cl.
CPC ....... *G05B 19/402* (2013.01); *G06K 17/0022* (2013.01); *B65G 47/917* (2013.01); *B65G 2203/0258* (2013.01); *G05B 2219/40005* (2013.01); *G05B 2219/45083* (2013.01); *Y10S 901/09* (2013.01); *Y10S 901/40* (2013.01); *Y10S 901/47* (2013.01)

(56) References Cited

U.S. PATENT DOCUMENTS

| | | | |
|---|---|---|---|
| 9,493,316 | B2 | 11/2016 | Girtman et al. |
| 9,498,887 | B1 | 11/2016 | Zevenbergen et al. |
| 2010/0318224 | A1* | 12/2010 | Okuda ............... B25J 9/1676 700/255 |
| 2015/0037131 | A1* | 2/2015 | Girtman ............... B25J 15/0052 414/797 |
| 2016/0016311 | A1* | 1/2016 | Konolige ............ B25J 9/1612 700/245 |
| 2016/0137435 | A1* | 5/2016 | Tanaka ................ B25J 15/0014 414/564 |
| 2017/0106534 | A1 | 4/2017 | Nakamoto et al. |
| 2018/0032949 | A1* | 2/2018 | Galluzzo ............... B25J 9/1692 |

* cited by examiner

ROBOTIC ITEM HANDLING USING A VARIABLE AREA MANIPULATOR

BACKGROUND

Modern inventory systems, such as those in mail order warehouses, supply chain distribution centers, airport luggage systems, and custom-order manufacturing facilities, face significant challenges in responding to requests for inventory items. One specific challenge faced by these systems relates to manipulating objects using robotic inventory handlers.

BRIEF DESCRIPTION OF THE DRAWINGS

Various embodiments in accordance with the present disclosure will be described with reference to the drawings, in which.

DETAILED DESCRIPTION

Figure 1:
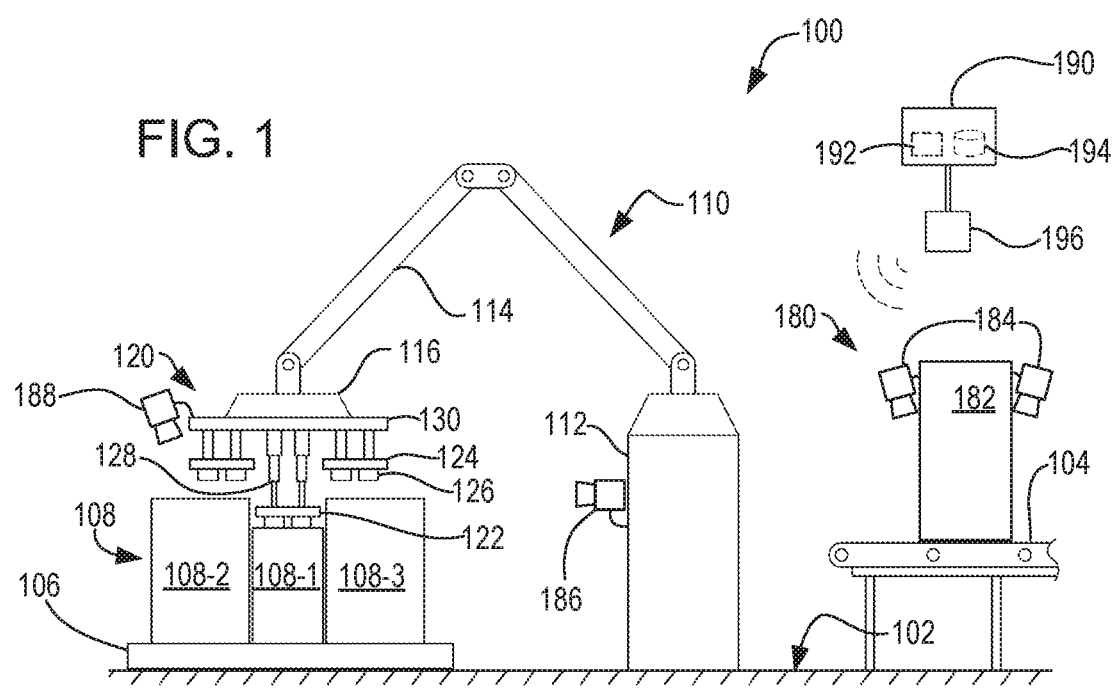
FIG. 1 is a simplified diagrammatic illustration showing a first example of an inventory management system using an inventory handler with a variable area manipulator deployed in an overhead and extended configuration, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Modern inventory systems deal with a large variety of inventory items, therefore automated handling system capable of handling many different types of containers and many shipping configurations for those containers is desirable. Conventional gripping devices generally require that containers be spaced apart, or placed on pallets or in specialized containers for lifting, so that grasping devices or lifting devices can be placed around or underneath the containers or items. Mono-directional gripping devices or area gripping devices are also used when only one side of an item may be available for grasping at a given time. Such gripping devices can include adhesive gripping elements, electrostatic or magnetic gripping elements, or elements based on negative pressure (i.e. vacuum-based gripping elements).

However, the above forms of gripping devices and associated methods require a minimum gripping area in order to function. For example, as with vacuum-based gripping elements, a sufficient number of gripping elements must be in contact with a smooth surface of an item in order to lift the item. This minimum gripping area can be difficult to obtain when items are being moved to or from closely-packed arrangements with other items or containers, as adjacent items can interfere with the approach of a gripping tool. Moreover, if the gripping tool is too large, items adjacent to the target object may be inadvertently struck. One potential approach is having multiple different gripping tools arrayed at each station in an automated inventory management system so that the appropriate gripping tool can be selected. However, such approaches are disadvantageous when floor space is at a premium, as is the case in many modern inventory management facilities.

Embodiments herein described are directed generally to an inventory system that employs inventory handlers with variable area manipulators for gripping the inventory items. The inventory system can include an inventory facility having inventory disposed in inventory holders and inventory containers, as bagged inventory and loose inventory, in boxes or the like, or in any other suitable configuration. Robotic handlers are operable to lift and displace some or all of the above-referenced types of inventory. Retention elements attached with the robotic handlers can vary. In some specific embodiments, the retention elements are vacuum elements, i.e. suction cups or similar elements that connect with a vacuum source to exert negative pressure in order to adhere inventory items to the retention elements. Generally, embodiments disclosed herein can be applied with any unidirectional retention element, i.e., any suitable form of adhesion, suction, grasping, electromagnetic, or friction-based adhesive element that can exert retentive force on an object from one side. In various embodiments, unidirectional retention elements can include many types of negative pressure devices including suction cups that produce retentive force due to deformation and those that produce retentive force due to a drawn negative pressure. Alternative forms of retention elements can include, but are not limited to, mechanically adhesive elements, mechanically grasping or pinching elements, hook and loop-type elements, magnetic or electrostatic retention elements, or the like. Inventory management systems can employ one or more robotic handlers for autonomously or semi-autonomously carrying out inventory management tasks, such as displacing designated inventory from one location to another. Suitable robotic handlers can include gantry robotics, conventional arm-based robotics, six-axis robotics, or the like.

Specific embodiments herein described are related to the variable area manipulators used in such systems as those described above. A variable area manipulator is a device that supports retention elements thereon across at least two sections, both connected to a common frame, where at least one of the sections can move independently of the other(s). In one example, a variable area manipulator includes a stationary section that supports retention elements as well as a first deployable support element, also supporting retention elements, that can be deployed in a direction away from the frame. When a deployable section is deployed, a subset of the retention elements supported by the deployable section is extended outward from the frame, presenting a relatively small area of retention elements as the gripping area for use in grasping an item. When the deployable section is retracted, both subsets of retention elements on the deployable and stationary sections are aligned together along a common plane, thus presenting a relatively large area of retention elements as the gripping area for retaining the item. Different embodiments can employ multiple deployable sections that can each extend away from the frame, sometimes independently and sometimes in groups, so that multiple sections can be deployed at once in order to vary the number or cumulative area of retention elements extended away from the stationary section and support. According to various embodiments, deployable sections can be deployed by distances in the range of about 10 cm to 50 cm. In some embodiments, the deployable section can be deployed by a minimum of least 30 cm.

Each configuration described above can be used depending on the characteristics of the item to be retained, e.g., if the item is heavy or exceeds a certain weight, the item might need to be lifted using a large gripping area, calling for the configuration using multiple subsets of retention elements. If the item presents a large surface area, the system may use multiple subsets of retention elements regardless of weight, for the utility of reducing strain on the item or manipulator. If the item is light, or if access to the item is limited, the system may select the configuration using only the smaller subset of elements in order to ensure that the manipulator can reach the item past neighboring items. In alternative examples, the variable area manipulator may have multiple, discrete deployable sections that can be used in combination to provide different gripping areas in a variety of geometries. Negative pressure may also be adjusted based on item weight. For example, a dense object may be lifted using a small subset of elements and high pressure. Alternatively, a low density object may be lifted using all of the elements and low pressure.

FIG. 1 illustrates a first example of an inventory management system 100 using an inventory handler 110 deployed in an overhead configuration with respect to a laden pallet 106. The inventory handler 100 includes a base 112 and a robotic arm assembly 114 that connects, via a pivoting connector 116, with a variable area manipulator 120. The variable area manipulator 120 has multiple retention elements 126 spread across at least a first, deployable support element 122 and a second, static support element 124. The deployable support element 122 can be extended from or retracted back to a supportive frame 130 by way of an actuator assembly 128.

As shown in FIG. 1, the inventory handler 110 can be used in a first use case where an item or container of interest 108-1 is removed (depalletized) from a collection of containers 108. Specifically, the inventory handler 110 is used to grasp the item of interest 108-1 despite sidelong obstruction by adjacent containers 108-2, 108-3, which exceed the height of the item of interest. In operation, the variable area manipulator 120 is employed by extending the deployable support element 122 away from the frame 130, thus configuring the variable area manipulator into a configuration that presents the smaller area of the deployable support element for use in grasping the item 108-1.

Once the deployable support element 122 is extended, the inventory handler positions the variable area manipulator 130 above the item of interest 108-1 using the robotic arm 114, and orients the variable area manipulator in a horizontal configuration (or other suitable orientation matching a surface of the item of interest 108-1) using the pivoting connector 116. Once oriented, the system 100 can use a combination of the robotic arm 114 and pivoting connector 116 to lower the variable area manipulator 120 toward the item of interest 108-1 until a subset of the retention elements 126 on the extended, deployable support element 122 are in contact with the item, and then cause the selected retention elements to retain the item.

The operation of the inventory handler 110 can be controlled by a system controller 190, which can be include a processor 192 and memory 194 for maintaining inventory data and responding to requests to retrieve or displace inventory items. Specific controller modules and their functions, as well as various control processes, are described in greater detail below with reference to FIGS. 5-9. A communication module 196 can facilitate communicating instructions to and receiving information from sensors, external networks, input/output devices, onboard controllers of various components in the inventory system 100, and the controller 190.

The positioning of the inventory handler 110 for managing inventory can be performed according to various methods. In some embodiments, specific positioning of the inventory handler 110 and thus retrieval or placement of inventory items 108 can be performed under user control. In various embodiments, however, the inventory handler 110 is controlled automatically by the controller 190 in order to load, move, and unload items 108. In various embodiments, sensors may be used to detect the positions and/or identities of the items 108. For example, in the use case where the system 100 is executing instructions to depalletized the item of interest 108-1, the system can employ one or more sensors 186, 188 to scan the items 108 and identify the item of interest from among them.

According to various embodiments, the sensors 186, 188 can be visual sensors operable to collect visual data, which is assembled by the controller 190 into three-dimensional data for modeling the inventory items 108 and locating a path for accessing the item of interest 108. Any suitable number of sensors for analyzing the items 108 may be positioned in the workspace 102, either stationary (e.g. stationary sensor 186) or movable, (e.g. mounted sensor 188). Suitable methods and systems for processing visual data to assemble such three-dimensional models are disclosed in, e.g., Rico Jonschkowski et al., "*Probabilistic Multi-Class Segmentation for the Amazon Picking Challenge,*" Technical Report RBO-2016-01, *Department of Computer Engineering and Microelectronics, Technische Universitat Berlin,* 2016, which is hereby incorporated by reference.

In some embodiments, sensors 186, 188 may also be operable to read indicia from the items 108, such as codes or labels, to identify the items against a data store containing item information pertaining to the items' size, weight, identify, destination in the inventory system 100, or other information. The indicia may be used during operation of the inventory handler 110 to determine item dimensions with greater precision during a palletizing or depalletizing operation, e.g. to determine which configuration of the manipulator 120 best matches the available contact area on the inventory item 108-1. Similarly, such information may be used to determine the weight of the inventory item 108-1, which may also be used to determine which configuration of the manipulator 120 is needed to lift the item, or in some cases, to locate a center of mass of the item in order to determine where to contact the item by the manipulator in order to achieve a stable lift.

In some embodiments, the procedure of palletizing an inventory item, i.e. placing it on the pallet 106 for storage or transport, can take place after determining some or all of the above inventory dimensional data, weight, or other characteristics by passing the inventory item 108-1 through a sensor apparatus 180, which can include a structure 182 containing any suitable number of mounted sensors 184. Sensors can include optical sensors 184 as well as a variety of additional sensors for taking item data, e.g. infrared sensors for reading barcodes or other comparable indicia, weight sensors, or the like. Items can be passed into or out of the system 100 by way of transport on pallets 106, or by way of various other conveyances including, but not limited to, conveyor belt 104, mobile or robotic drive units, forklifts, or any other suitable conveyance.

Figure 2:
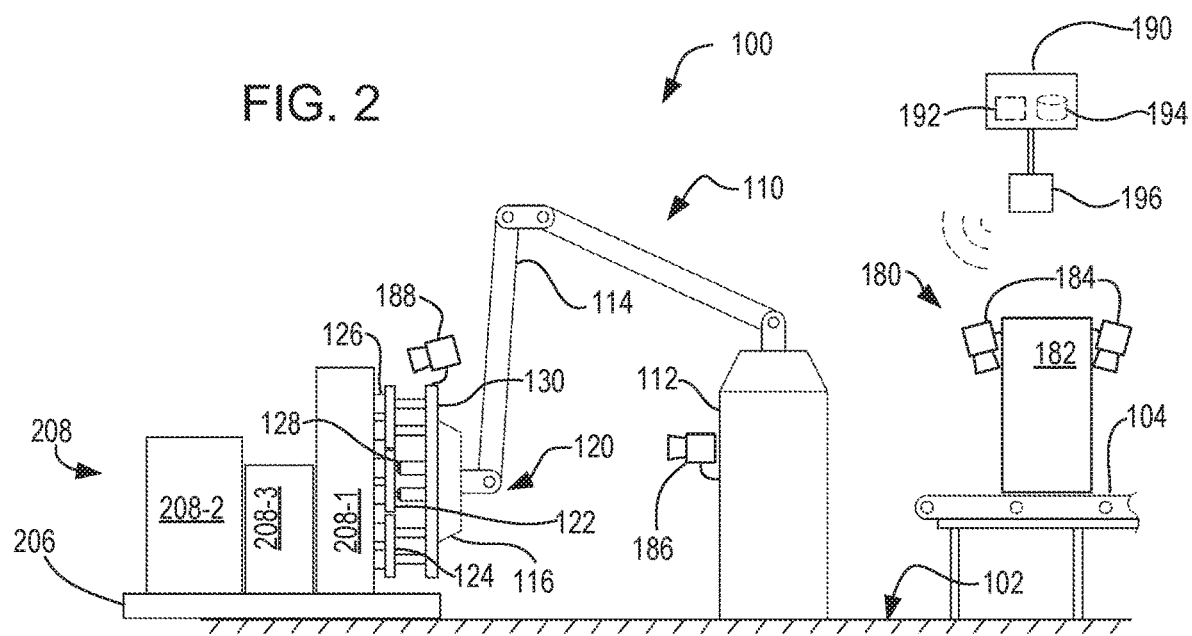
FIG. 2 is a simplified diagrammatic illustration showing the inventory management system of FIG. 1 with the variable area manipulator deployed in a sidelong and retracted configuration.

FIG. 2 illustrates the inventory management system 100 using the inventory handler 110 deployed alongside a second laden pallet 206, showing a second use case for palletizing or removing items in which the item 208-1 is removed via contact with a side of the inventory item rather than a top surface. In various embodiments, the system 100 can take image data of the inventory items 208 and their immediate environment and use the image data to select an appropriate strategy for item placement or removal based on a system of rules. For example, as shown in FIG. 1, a top-loading or unloading configuration may be used even though a small area of the manipulator 120 is used when the controller 190 has assessed, based on image data, that the best or only access path for contacting the inventory item 108-1 is from the top. This will generally be the case when an item is surrounded.

As shown in FIG. 2, the system 100 can also select a side-grasping option based on a variety of parameters. In one example, the controller 190 defaults to a top-loading or top-unloading configuration as shown in FIG. 1 except where prevented by one or more rules. For example, on such rule can include assessing the inventory item 208-1 for a largest available surface area, and utilizing the corresponding surface for attachment. This strategy advantageously minimizes strain on any item packaging or container, and on the retention elements 126. A second such rule can include filtering out surfaces as potential surfaces for attachment based on the weight of the item. Where an item is too heavy or unwieldy to lift from one direction, the system 100 can remove the corresponding configuration from the range of possible lifting configurations. For example, as shown in FIG. 2, the selected inventory item 208-1 has a large side surface area and a small top surface area. In some embodiments, where the weight of the inventory item 208-1 exceeds a threshold, the system 100 is precluded from attempting to lift the inventory item from the small top surface, and must instead opt for locating and lifting the item by a larger surface, e.g. the side surface.

Figure 3:
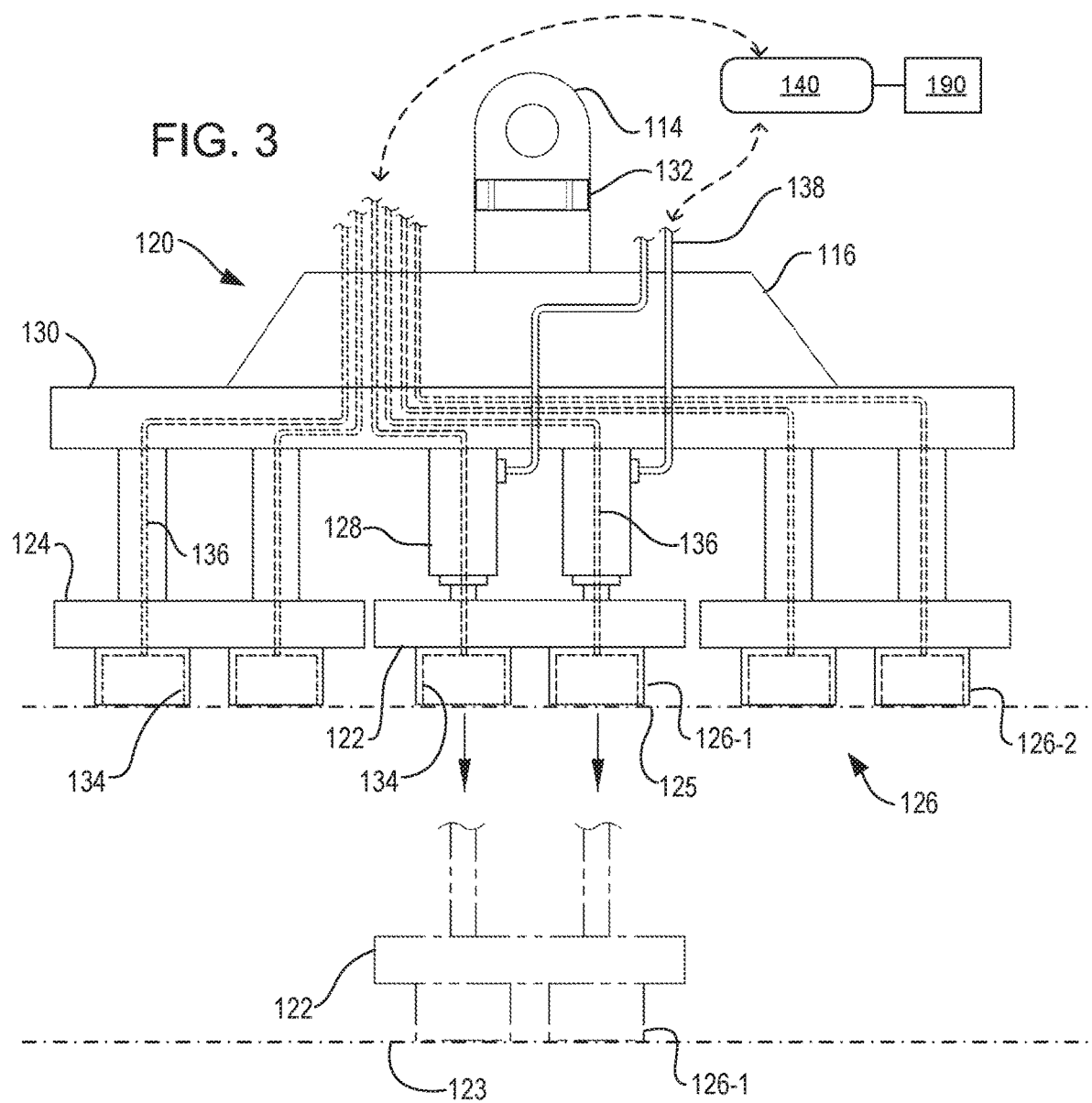
FIG. 3 is a simplified diagrammatic illustration in a side view showing the variable area manipulator of FIGS. 1-2 in greater detail, in accordance with various embodiments.

FIG. 3 is a simplified diagrammatic illustration in a side cross-sectional view showing the variable area manipulator 120 of FIGS. 1-2 in greater detail, in accordance with various embodiments. The manipulator 120 includes a frame 130 connected at one side to a pivoting connector 116, and at an opposite side with the deployable support element 122 and static support elements 124. As shown, the deployable support element 122 is sandwiched between two split static support elements 124. The deployable support element 122 is deployable away from the frame 130 by actuator(s) 128, while the static support elements 124 are fixed relative to the frame.

In operation, the manipulator 120 can be configured between at least two configurations: a first configuration in which the deployable support element 122 is extended away from the frame 130, and a second configuration in which the deployable support element is collapsed toward the frame and aligned with the static support elements 124. In the first configuration, retention elements 126-1 are aligned in a first plane 123, while retention elements 126-2 are aligned in a second plane 125, thus presenting the retention elements 126-1 of the deployable support element for use in retaining an item or container alone. For example, the first configuration may be used to extract a single item from a pallet of stacked items where the exposed face of the single item is smaller than the profile of combined retention elements 126-1 and 126-2. In the second configuration, the deployable support element 122 is retracted toward the frame 130 as shown, resulting in the deployable and static support elements 122, 124 being aligned in the second plane 125, and presenting the combined sets of retention elements 126-1, 126-2 of both the deployable and static support elements for use in retaining a larger item together.

In accordance with various embodiments, items can be retained by the retention elements 126 by way of active vacuum-based elements or vacuum cups, as shown. The retention elements 126 as shown herein include an inner cavity 134, and are generally made of a flexible material that can establish an airtight seal with an item and hold a vacuum while pressed up against the item. The various retention elements 126 can connect with a vacuum source 140 under the control of a system controller 190, e.g. via pneumatic channels 136 that extend into the inner cavities 134 of each retention element. In some embodiments, the retention elements 126 are connected with individual vacuum sources; however, in various other embodiments, the retention elements 126 are connected with a singular vacuum source, and are valved so that only a select subset of the retention elements 126 draw on the vacuum source at one time. In accordance with various embodiments, the applied vacuum provided for securing the retention elements 126 to an item can vary from about 182 to 1676 kPa, which is suitable to securely lift and retain inventory items or containers up to about 190 kg.

The deployable support element 122 can also be deployed away from the frame by pneumatic action, among other methods. For example, in at least one embodiment and as shown, the deployable support element 122 is connected with the frame by actuators 128 in the form of linear pneumatic actuators that can expand or contract based on the application of positive or negative pressure, e.g. by way of the vacuum source 140 (or other vacuum sources, pressure sources, or the like) or concomitant compressors or other compressed air sources. In alternative embodiments, the actuators 128 may be replaced with alternative forms of actuators, such as but not limited to linear electromagnetic actuators, servos, or the like. In alternative embodiments, the actuators 128 may not be exclusively sandwiched between the deployable support element 122 and frame 130, but may instead extend through the frame.

In various embodiments, the manipulator 130 can include one or more force sensors 132 positioned to detect stress on the manipulator or on the robotic actuator 114. Such force sensors can take the form of torque sensors, strain sensors, or other suitable sensor package for detecting the amount and direction of force exerted on the manipulator 120 by operation or by an attached load. These force sensors 132 can detect, for example, whether a load placed on the manipulator 120 exceeds a weight threshold for total weight, whether a torque exerted on the manipulator exceeds a torque threshold, or whether an unexpected force is being applied to the manipulator, e.g. by way a collision between the manipulator and an environmental object. Such sensors can also be used in order to estimate the approximate location of a center of mass of a retained item under the control of the manipulator by calculating the location based on dimensional data of the inventory item and the applied force.

Figure 4:
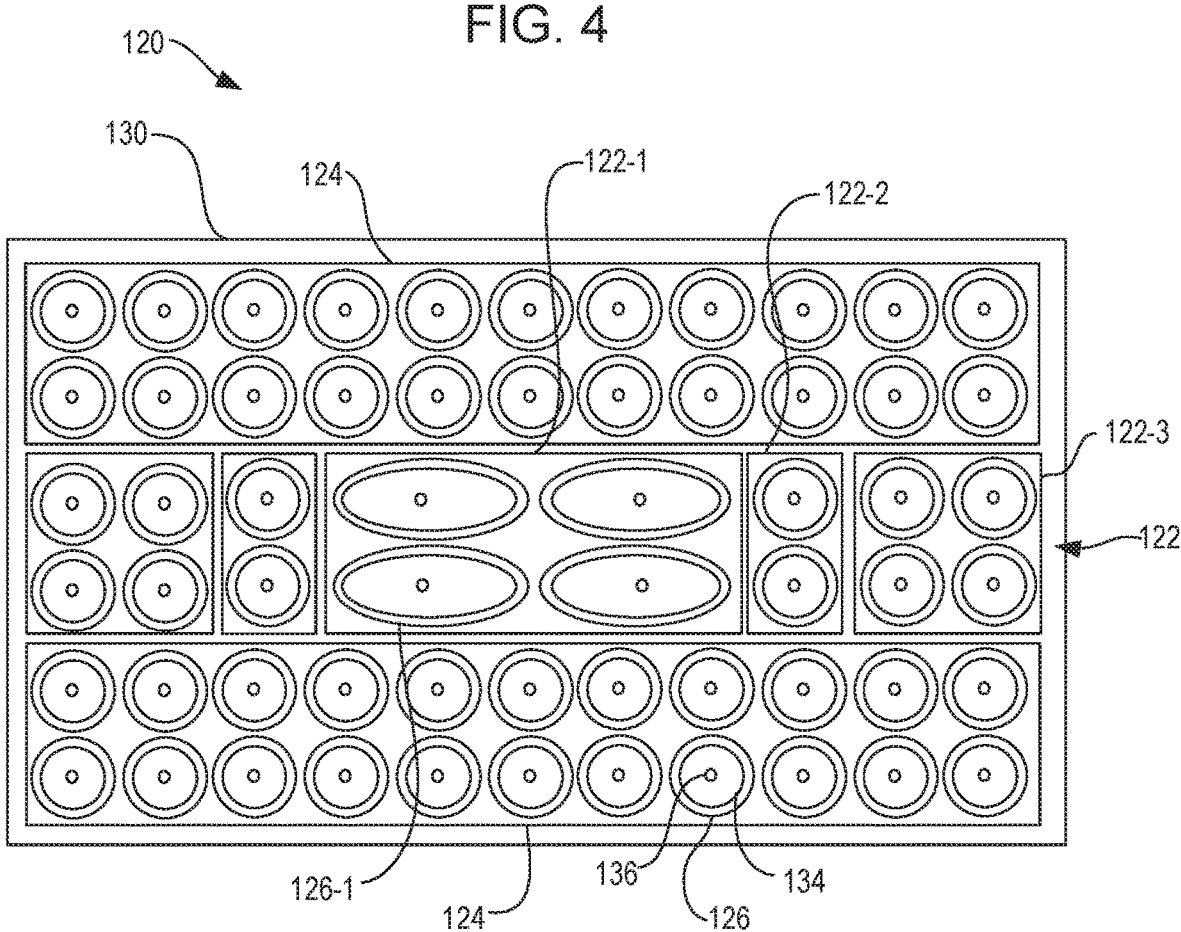
FIG. 4 is a simplified diagrammatic illustration in a bottom view showing an example distribution of deployable and static supports of a second example of a variable area manipulator, in accordance with various embodiments.

FIG. 4 is a simplified diagrammatic illustration in a bottom view showing an example distribution of deployable 122 and static 124 supports of the variable area manipulator 120, in accordance with various embodiments. A series of deployable support elements 122 is aligned along a center of the frame 130 and paralleled the static support elements 124. Each of the deployable and static support elements 122, 124 is equipped with an array of retention elements 126. As shown, the retention elements 126 are vacuum-based retention elements formed of vacuum cups or similar, with internal cavities 134 connected with pneumatic channels 136 to a vacuum source 140 (FIG. 3).

The series of deployable support elements 122 includes a central, primary deployable support element 122-1, as well as additional, intermediate deployable support elements 122-2, 122-3 that, in combination with the primary support element, provide increasingly large gripping areas for retaining inventory items or containers. In operation, the primary deployable support element 126-1 is typically used in all lifting cases, and is sized to correspond with a smallest item or package typically encountered in an inventory management facility. To that end, the primary deployable support element 126-1 may also be equipped with specialized or heavy-duty retaining elements 126-1 designed to limit wear over repeated use.

The specific arrangement of support elements may vary, with embodiments possessing generally at least two such elements that include a deployable support element and a static support element. In some embodiments, a manipulator can have from 2-7 support elements. In various embodiments, a minimum area for the primary, deployable support element 122-1 is on the order of about 15 cm×15 cm, or about 15 cm×20 cm. In some embodiments, the primary and intermediate support elements 122-1, 122-2, 122-3 may be arranged in a substantially linear model, each support element being aligned with one another, in order to provide highly variable length support at the retention element, which can provide for lifting narrow containers. The various support element geometries are important for providing that sufficient area of the item or container is contacted by retention elements to provide sufficient lifting force. In some embodiments, the target contacted area for properly retaining an inventory item is on the order of about 30%.

In operation, the manipulator 120 is configured using a combination of the primary deployable support element 122-1 with selected additional, intermediate support elements 122-2, 122-3 based on the dimensions, weight, and/or access path available to retrieve the target inventory item or container. For example, if the best accessible dimension of the item for use as a contact area is larger than the primary deployable support element 122-1, but smaller than a combination of that support element and any additional support elements, the manipulator 120 will be configured by extending only the primary deployable support element. If the available contact area is slightly larger than a combination of the primary deployable support elements and two of the intermediate support elements 122-2, then the manipulator will instead be configured by extending this combination of support elements, and so on. Various alternative embodiments can have a wide variety of specific arrangements of deployable support elements, and the specific arrangements can be selected based on the number and dimensions of items or containers open which an inventory management facility is standardized.

Figure 5:
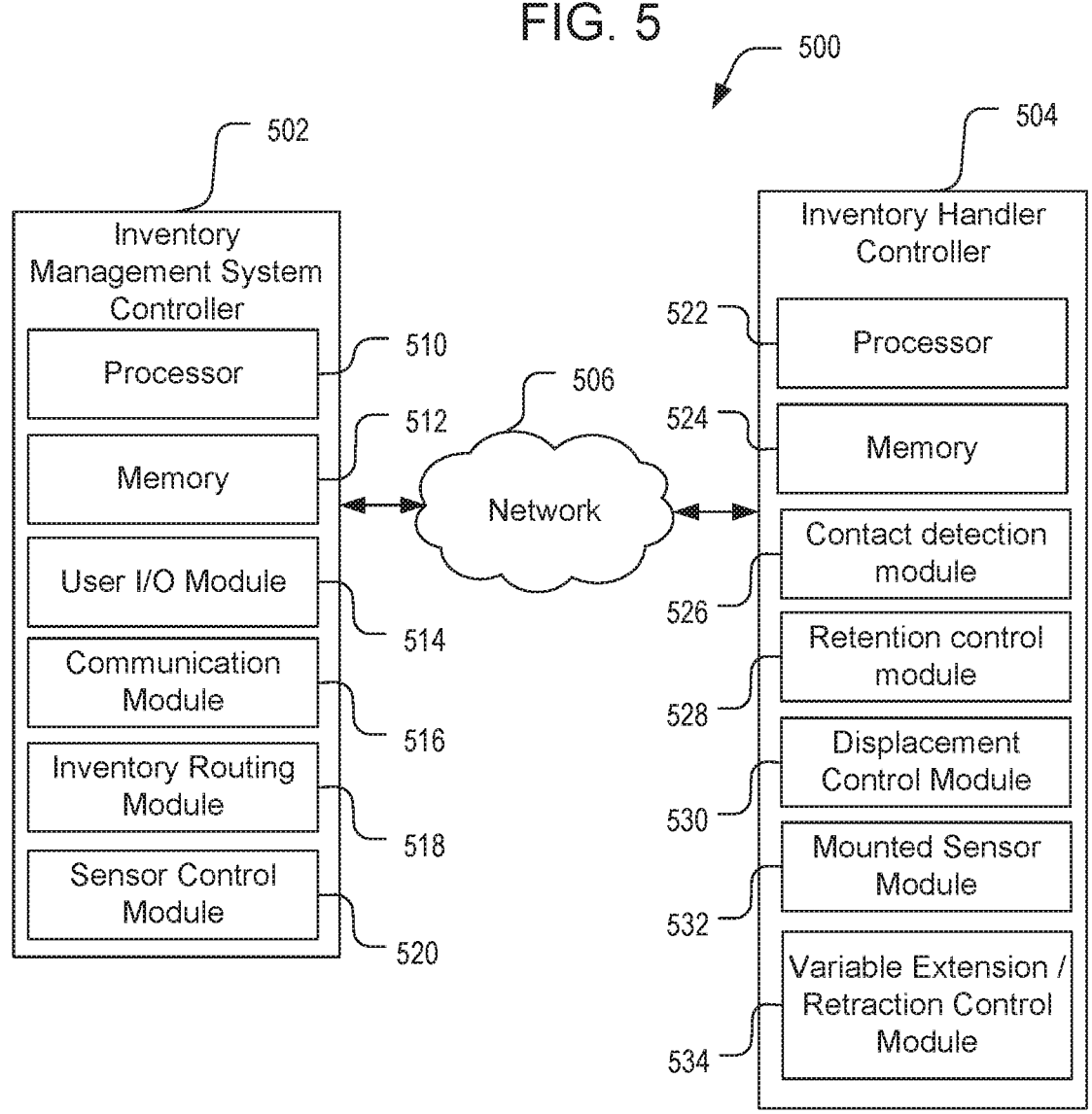
FIG. 5 is a simplified block diagram illustrating an example system for controlling an inventory system as described with reference to FIGS. 1 and 2.

FIG. 5 is a simplified block diagram illustrating an example system for controlling an inventory system as described with reference to FIGS. 1 and 2, and in conjunction with a manipulator as shown in FIGS. 3 and 4, in accordance with various embodiments of the present disclosure. For example, the system 500 can include an inventory management system controller 502 for storing inventory information and controlling disposition of inventory, an inventory handler controller 504 for controlling the inventory handling robotics, e.g. inventory handler 110 and manipulator 120 (FIGS. 1-4) to retrieve and displace inventory, and a network 506 that facilitates communication between components of the system.

The system controller 502 can include a processor 510 and memory 512 for maintaining inventory data and responding to requests to retrieve or displace inventory items, and for maintaining various modules. For example, a user input/output (I/O) module can facilitate receiving instructions from a user for retrieving, stowing, or moving inventory items in an inventory facility, and for providing indications to a user. A communication module 516 can facilitate communicating instructions to and receiving information from sensors, external networks, input/output devices, and one or more inventory handler controllers. An inventory routing module 518 can be operable to cause one or more inventory handler controllers, such as the inventory handler controller 504, to retrieve and displace inventory items, and for determining access paths for moving inventory items to and from storage locations, including but not limited to tightly spaced pallets containing multiple other inventory items that present potential obstacles to placement or retrieval. A sensor control module 520 can control the various sensors that scan and identify inventory items and environmental obstructions.

The inventory handler controller 504 can also include a controller processor 522 and controller memory 524 for maintaining some or all of the following modules. A contact detection module 526 can, in conjunction with sensed data and/or stored data, determine locations of contact surfaces of inventory items suitable for engagement by the retention elements of manipulator. A retention control module 528 can, in conjunction a vacuum source or other suitable retention method, control said retention elements for generating sufficient retaining or adhesive force at the retention elements to retain and displace inventory items. A displacement control module 530 can control robotic displacement of an inventory handler, e.g. for moving the manipulator into position to grasp an inventory item, or to move a grasped item from a first location to a second location. A mounted sensor module 532 can be used to control one or more sensors that provide data to the inventory handler controller and/or to the inventory manager, such as visual data concerning the position of an inventory item relative to the inventory handler, visual data concerning surface features of an inventory item for assessing suitability of contact surfaces on the inventory item, force data concerning the separating force generated between gripping elements of an inventory handler, force data concerning torque exerted by a hanging inventory item retained by the manipulator, and other data. The contact detection module 526 and/or the system controller 502 may be configured to use the visual data obtained by the sensor module 528 for generating a three-dimensional model of an inventory item and/or of its immediate environment, and using the three-dimensional model for identifying available regions of the inventory item for use as contact surfaces for the retaining elements.

As described above, an inventory handler (e.g. inventory handler 110, FIG. 1) can use a manipulator 120 that can provide variable contact area in order to retrieve items from close-packed configurations, as on pallets; to replace items into close-packed configurations; and to maneuver items from one location to another using variable manipulator configurations to avoid environmental obstacles. Specific methods of controlling an inventory handling system, or inventory handler using a variable-area manipulator, are described below with reference to FIGS. 6-9 which describe processes 600, 700, 800, and 900. Any or all of the processes 600-900 may be performed in combination with one another except where explicitly contraindicated. The processes 600-900 may be performed in the context of an inventory management system such as system 100 (FIG. 1), and/or under the control of an inventory management system controller 502 (FIG. 5).

Figure 6:
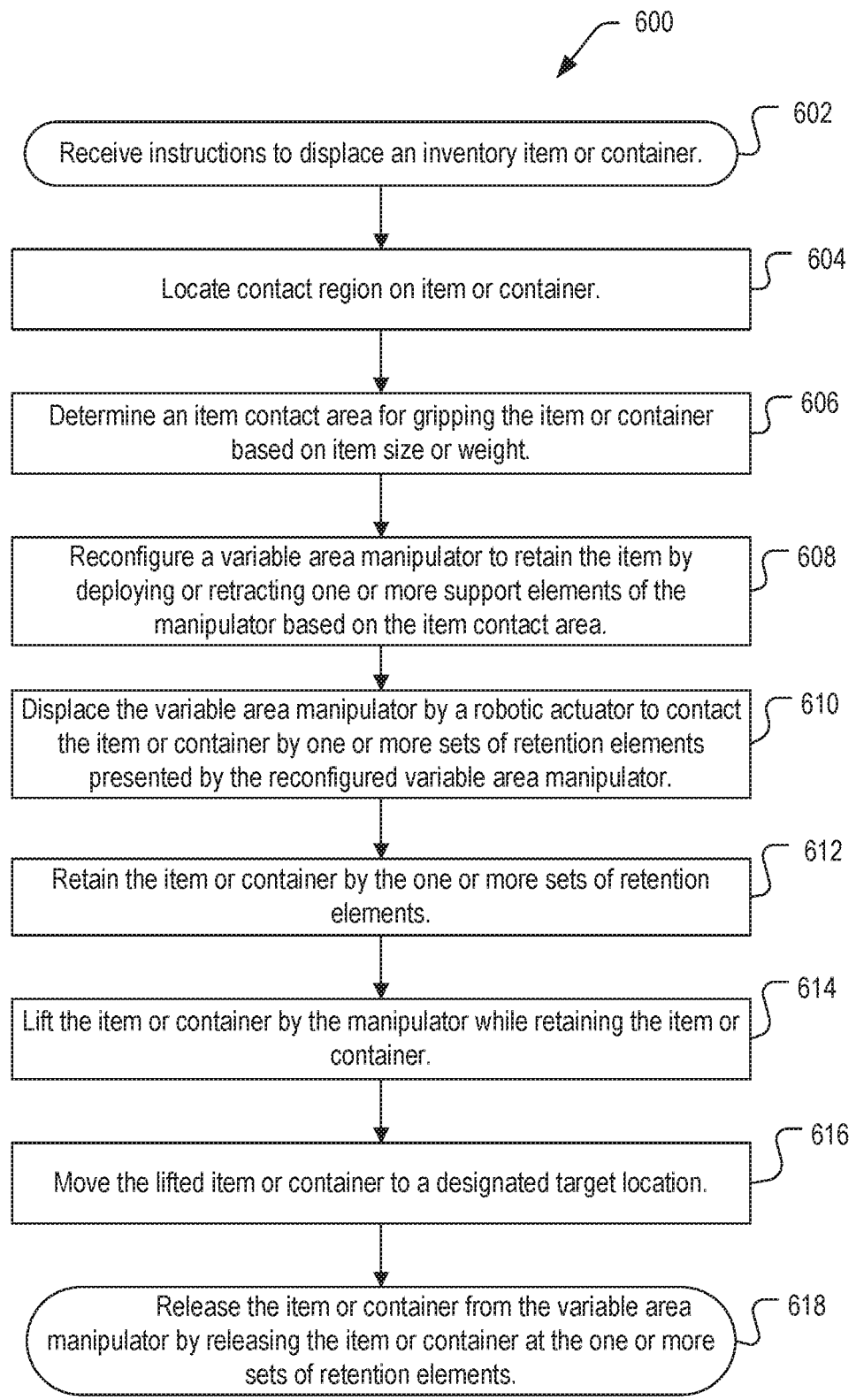
FIG. 6 illustrates a first example process for handling an inventory item or container, in accordance with embodiments.

FIG. 6 illustrates a first example process 600 for handling an inventory item or container, particularly with reference to item retrieval or depalletization, in accordance with various embodiments. In at least one embodiment, the system can receive instructions to displace an inventory item or container (act 602). The system can scan a location containing the inventory item such as a pallet, inventory holder, inventory bin, or other location to locate the item and identify potential contact areas or contact regions on the inventory item or container (act 604). Scanning can be performed by way of any suitable sensor, but particularly by way of a vision system that may be fixed or mounted to an inventory handler. The system can then determine the appropriate item contact area for gripping the item or container (act 606).

The specific choice of contact area can be informed by any suitable combination of item dimensional data, such as that obtained by the vision system, or by way of stored dimension information obtained by way of identifying the item or container against a data store containing the information. The contact area may also be chosen based on an item or container weight. For example, where a container exceeds a threshold weight for lifting based on a small surface area (e.g. a top of the container), the system may select a side of the container having a greater contact area, so that the container can be gripped by the side with the greater contact area.

When the contact area has been identified, the system can cause the manipulator to reconfigure in order to present the appropriate combination of support elements, e.g. a combination of one or more deployable support elements for small to mid-sized containers, or in some cases an entire set of static and deployable support elements together in a retracted configuration for large containers (act 608). Once configured, the manipulator can be displaced by a robotic actuator to contact the item or container by way of the retention elements presented as a result of the selected configuration (act 610). Once the item or container has been contacted, the system can cause the retention elements to retain the inventory item, e.g. by generating a suction force across the presently used set of retention elements (act 612).

The item or container, once retained, can be moved by the inventory handler in conjunction with the manipulator by lifting the item or container (614) and moving the item or container from its original location to a second, target location (act 616). The system can then cause the manipulator to release the item or container from the manipulator by releasing the retention elements thereon and depositing the item or container at the target location (act 618).

Figure 7:
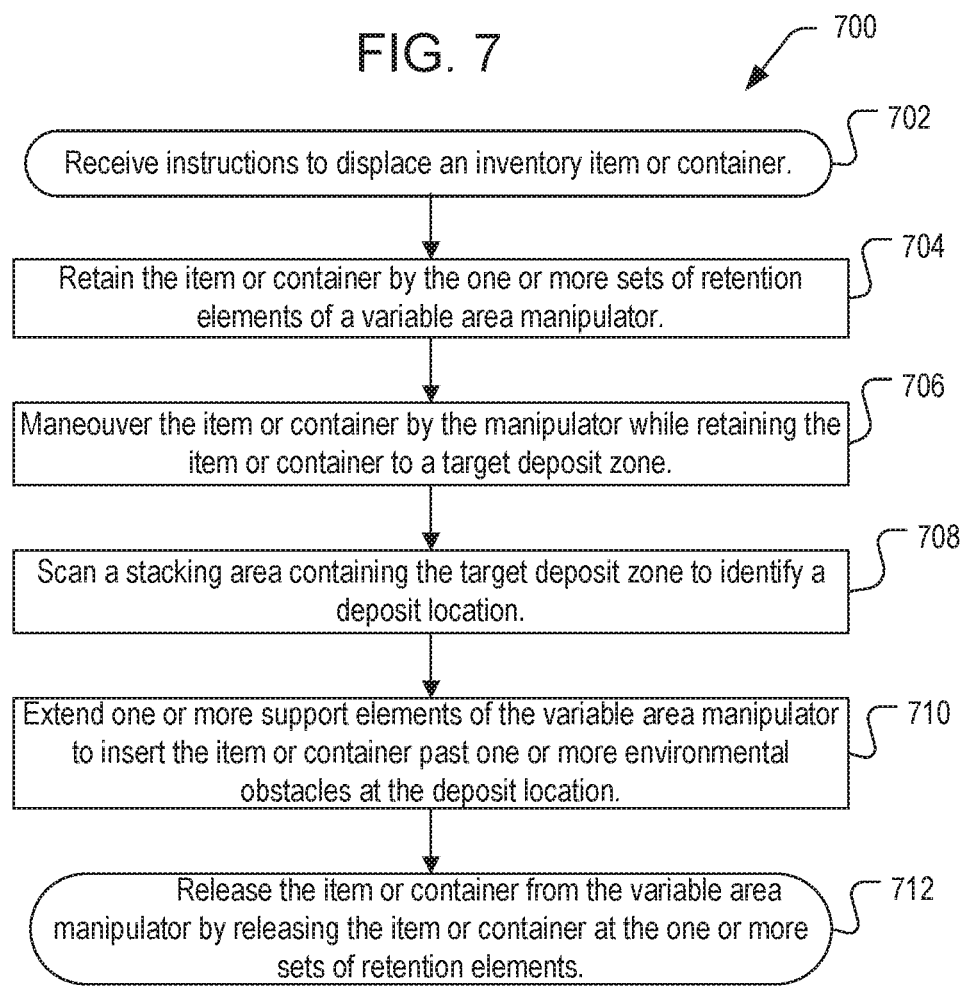
FIG. 7 illustrates a second example process for handling an inventory item or container, in accordance with embodiments.

FIG. 7 illustrates a second example process 700 for handling an inventory item or container, particularly with reference to item placement or palletization, in accordance with various embodiments. In at least one embodiment, the system can receive instructions to displace an inventory item or container from an initial location to a deposit location (act 702). The system can then cause an inventory handler, in conjunction with a manipulator, retain the item or container by one or more sets of retention elements as described above with reference to process 600 of FIG. 6 (act 704). Once retained, the system can then cause the inventory handler to maneuver the item or container by way of the manipulator while retaining the item or container, until the item or container is positioned proximate to a target deposit zone containing the deposit location (act 706).

The system can scan a stacking area or other suitable location, such as a pallet, container, conveyance, or other location, to identify the deposit location (act 708). In some embodiments, the deposit location will be a prescribed location for assembling a pallet or other grouping of inventory items or containers. The scanning can further identify an access path for depositing the inventory item or container. For example, the system can determine an unobstructed volume for moving the combined inventory item or container along with the manipulator, and determine a three-dimensional path based on the volume that results in placing the inventory item or container at the deposit location without causing collisions with other items or containers. The system can then positioned the manipulator adjacent or above the deposit location. Once positioned, the system may extend one or more of the deployable support elements from the frame of the manipulator in order to insert the item past one or more environmental obstacles at the deposit location (act 710), and then release the item from the manipulator (act 712).

Figure 8:
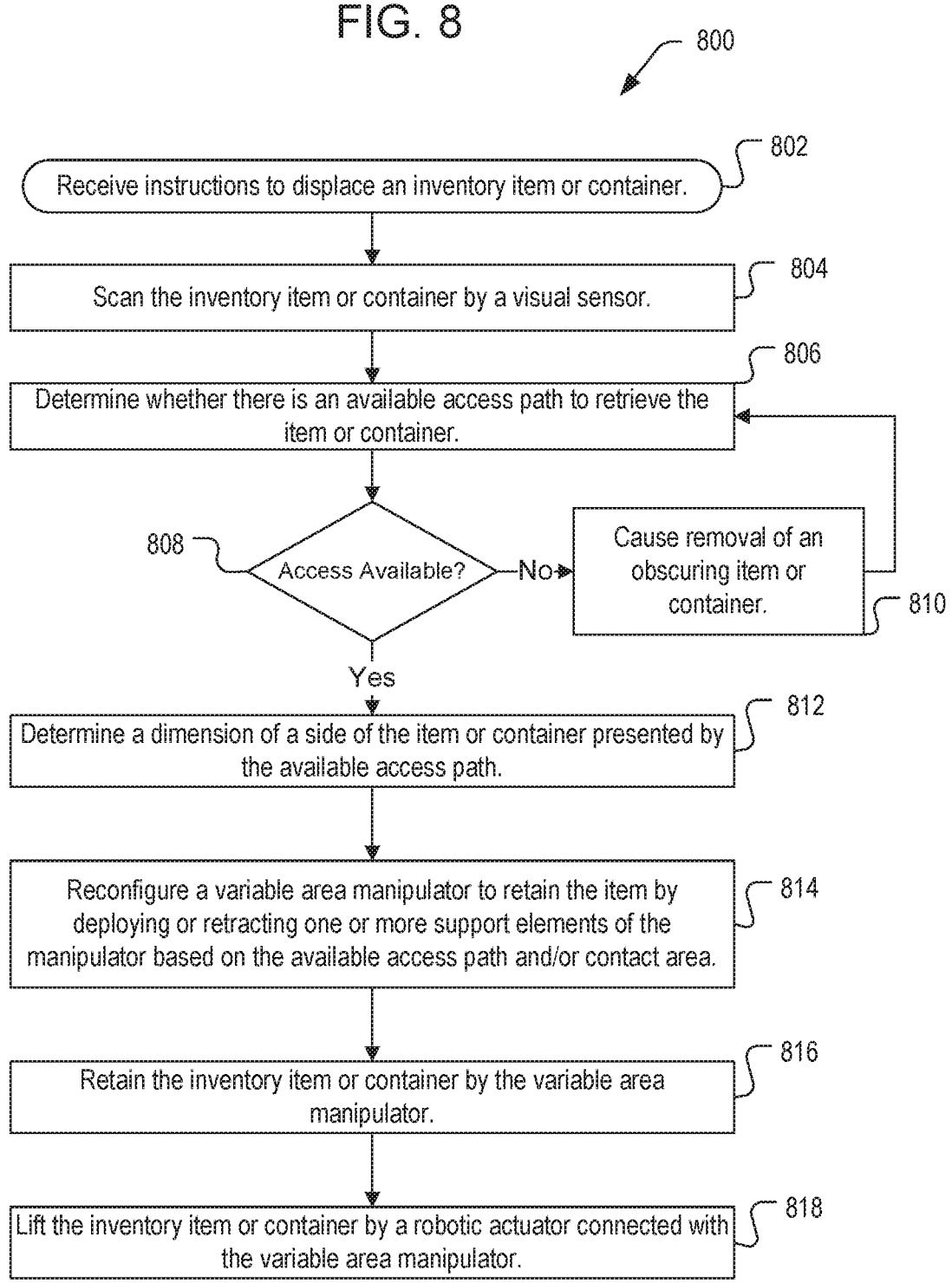
FIG. 8 illustrates a third example process for handling an inventory item or container, in accordance with embodiments.

FIG. 8 illustrates a third example process 800 for handling an inventory item or container, particularly with reference to using the variable area manipulator based on an access path, in accordance with various embodiments. In accordance with at least one embodiment, the system can receive instructions to displace an inventory item or container (act 802). The system can then scan the inventory item or container and/or its immediate surroundings (ac 804), and determine based on the visual information whether there is an available access path for retrieving the item or container (act 806).

In some cases, access may not be readily available (act 808) in which case the system can direct the inventory handler to remove one or more inventory items or containers in the way of retrieving the inventory item or container, and repeat a determination step to search for available access paths until successful (act 810). The available access path can generally appear on a side of the item or top of the item to be moved. Once the system has determined a path that provides access to the item or container, the system can determine a dimension of the side of the item or container presented by the available access path (i.e., a dimension of an exposed side or top surface).

The system can then reconfigure a manipulator by selectively deploying or retracting one or more support elements of the manipulator based on the available access path and/or the available contact area of the item or container to be moved (act 814). The system can then bring the manipulator into contact with the item or container in order to retain the item or container as described above (act 816), and subsequently lift and move the inventory item or container by a robotic actuator connected with the manipulator (act 818).

Figure 9:
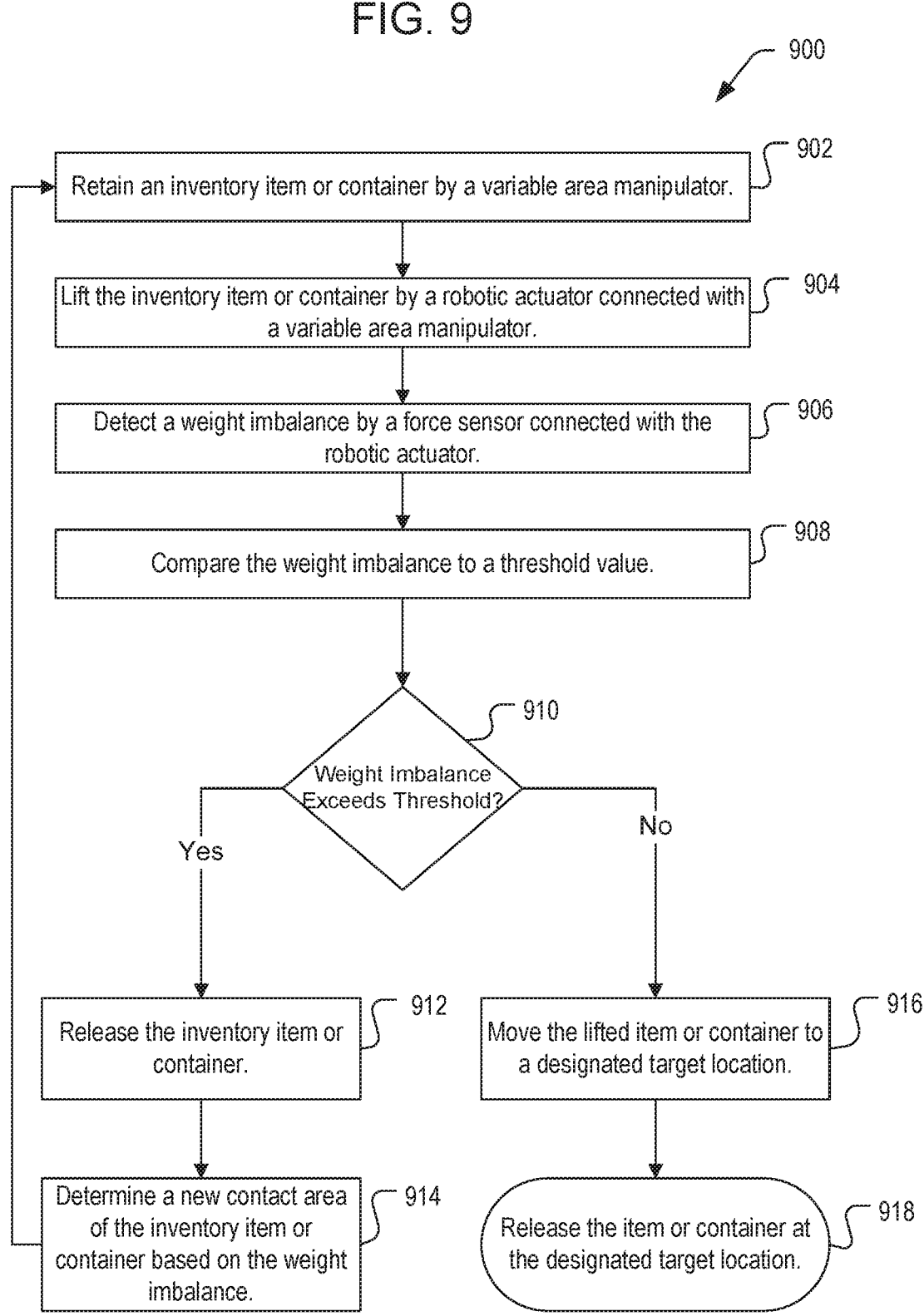
FIG. 9 illustrates a fourth example process for handling an inventory item or container, in accordance with embodiments.

FIG. 9 illustrates a fourth example process 900 for handling an inventory item or container, particularly with reference to methods of load balancing, in accordance with various embodiments. In accordance with at least one embodiment, the system can retain an inventory item or container for movement by way of a variable-area manipulator (act 902). The manipulator generally assumes initial contact with the inventory item or container near a center of the inventory item. The item or container can then be lifted by a robotic actuator connected with the manipulator to remove the inventory item from an initial location, such as a pallet or bin (act 904). One or more force sensors positioned near the interface between the manipulator and robotic actuator can be used to detect the forces acting on this interface (act 906), and collect the force data. For example, in some embodiments, the force sensor(s) can detect a weight of the inventory item or container and/or a torque exerted on the interface between the robotic actuator and manipulator, where torque is indicative of a weight imbalance caused by an off-center load or off-center connection to the inventory item or container.

The system can proceed to compare the detected weight imbalance to a threshold value corresponding to a safety standard or equipment tolerance (act 908). According to various embodiments, the threshold value can indicate a maximum torque as sensed by a torque or force sensor positioned on or adjacent to the manipulator or other aspect of the robotics in the lifting apparatus, where an imbalance indicates that the manipulator has grasped an item off-center, or that the center of mass of an item is not centered or not where expected. In at least one such embodiment, a threshold for a maximum torque can be +/−10 Nm. According to various other embodiments, the threshold value can also, or alternatively, indicate a maximum variance in the weight of an item compared to an expected weight. For example, if an item's weight, as measured by a force sensor, falls outside a defined range around the expected item weight, this variance may be indicative of a misidentified item, of items being stuck together, or other error. In at least one such embodiment, a threshold for maximum variance from an expected weight can be about +/−0.113 kg. In the cases of either class of embodiments discussed above, if the weight or torque imbalance is major, i.e. if the imbalance exceeds a threshold value, the system can release the inventory item or container (act 912), and determine a new location or area on the inventory item better suited for retaining the item (act 914). For example, in some embodiments, the location of the center of gravity of the inventory item or container may be estimated based on known dimensional data of the inventory item or container and the measured weight and/or torque recorded at the force sensor, at which point the item may be retained once again via the manipulator and inventory handler. In addition to or as an alternative to repositioning the manipulator, the system can generate an indication of the error for presentation to a user.

If the weight imbalance is less than a threshold value, the inventory item or container has been retained sufficiently near the center of gravity, and the system will continue to carry out any previously provided instructions for moving the lifted item or container to a designated target locations (act 916), and then release the item or container at the designated target location (act 918).

Some or all of the processes 600, 700, 800, 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for handling inventory in an inventory management facility, the system comprising:
a manipulator comprising:
a frame;
a first deployable support element connected with the frame by a first actuator, the first deployable support element comprising a first set of retention elements configured to retain a first item or a second item; and
a second support element connected with the frame and comprising a second set of retention elements configured to retain the first or second item, wherein the manipulator is configurable between a first configuration in which the first deployable support element can contact and retain the first or second item without contact between the second set of retention elements and the first or second item, and a second configuration in which the first deployable support element and second support element can contact and retain the first or second item together by the first and second sets of retention elements;
a robotic actuator connected with the frame and configured to move the frame in order to cause the manipulator to contact the first or second item;
an imaging device that generates image data of the first or second item and a surrounding environment; and
a controller comprising at least one processor and memory containing nontransitory executable instructions that, when executed by the processor, cause the controller to at least:
receive instructions to contact and retain the first item and the second item;
generate first and second image data, via the imaging device, of the first item and of the second item;
generate first and second dimensional data of the first item and of the second item based on the generated image data;
identify a first item contact area of the first item based on the generated first dimensional data;
compare the first item contact area to a boundary of the second support element;
in response to a determination, based on the comparing, that the first item contact area exceeds the boundary:
selectively reconfigure the manipulator from the first configuration to the second configuration;
cause the robotic actuator to displace the manipulator to bring the first and second sets of retention elements into contact with the first item; and
cause the manipulator to retain the first item by the first and second sets of retention elements; and
identify a second item contact area of the second item based on the generated second dimensional data;
compare the second item contact area to a boundary of the second support element; and
in response to a determination, based on the comparing, that the second item contact area does not exceed the boundary:
selectively reconfigure the manipulator from the second configuration to the first configuration;
cause the robotic actuator to displace the manipulator to bring the first set of retention elements into contact with the second item without contacting the second item by the second set of retention elements; and
cause the manipulator to retain the second item by the first set of retention elements.

2. The system of claim 1, wherein the controller is further configured to:
determine that an item contact area of an additional item is clear of obstructions based on the image data; and
cause displacement of the manipulator, in response to the determination that the item contact area is clear of obstructions, to bring the manipulator into contact with the additional item at the item contact area without colliding with elements of the environment.

3. The system of claim 1, wherein the controller is further configured to:
reconfigure the manipulator from the second configuration to the first configuration in response to determining, based on the image data, that an item contact area of an additional item is sufficiently clear of obstructions to accommodate the first deployable support element adjacent the additional item in the first configuration but not sufficiently clear of obstructions to accommodate the second support element in the second configuration.

4. The system of claim 1, wherein the controller is further configured to:
determine, based in part on the image data, that a side surface of an additional item is available for contact by the manipulator;
cause displacement and rotation of the manipulator to bring the manipulator into contact with the additional item at the side surface of the additional item.

5. The system of claim 1, further comprising a force sensor connected with one of the frame or the robotic actuator near an interface between the frame and the robotic actuator; wherein the controller is further configured to:
cause the robotic actuator to lift the first item or the second item by the manipulator; and
determine a center of mass of the first item or the second item based an output of the force sensor.

6. The system of claim 1, wherein the controller is further configured to:
cause the robotic actuator to displace the first item or the second item from a first location to a second location while the respective first or second item is retained by the manipulator; and
cause the manipulator to release the first item or the second item at the second location.

7. A method, comprising:
generating image data, via an imaging device, of a first item and of a second item in an environment accessible by a manipulator, the manipulator comprising at least:
a frame;
one or more deployable support elements including a first deployable support element connected with the frame by a first actuator, the first deployable support element comprising a first set of retention elements; and
a static support element connected with the frame and comprising a second set of retention elements;
generating first and second dimensional data of the first and second items respectively, based on the image data;
identifying a first item contact area of the first item based on the first dimensional data;
comparing the first item contact area to a boundary of the static support element;
in response to a determination, based on the comparing, that the first item contact area is less than an area of the boundary:
selectively reconfiguring the manipulator from a second configuration to a first configuration by selectively deploying at least the first deployable support
element of the manipulator;
contacting, with the manipulator in the first configuration, the first by the first set of retention elements but not the second set of retention elements; and
retaining the first item by the first set of retention elements; and
identifying a second item contact area of the second item based on the second dimensional data;
comparing the second item contact area to the boundary of the static support element;
in response to a determination, based on the comparing, that the second item contact area is less than the area of the boundary:
selectively reconfiguring the manipulator from the first configuration to the second configuration by selectively retracting the one or more deployable support elements of the manipulator to align with the static support element;
contacting, with the manipulator in the second configuration, the second item by the first set of retention elements and by the second set of retention elements; and
retaining the second item by the first set of retention elements and the second set of retention elements.

8. The method of claim 7, further comprising:
generating approach path data based on the image data indicative of available space in a vicinity of a third item contact area of a third item;
determining, based on the approach path data, that the available space in the vicinity of the third item contact area is sufficient to accommodate the first deployable support element but not sufficient to accommodate the static support element;
selectively deploying the first deployable support element based on the determining; and
contacting the third item by the first set of retention elements without contacting the third item by the second set of retention elements.

9. The method of claim 7, wherein the manipulator comprises a plurality of deployable support elements including the first deployable support element, each deployable support element being configured to deploy or retract with respect to the frame, and each deployable support element comprising a respective set of additional retention elements; and further comprising:
selecting a subset of the deployable support elements based on a contact area of an additional item such that a difference between the contact area of the additional item and a combined boundary of the selected subset of deployable support elements is minimized;
selectively deploying the subset of the deployable support elements; and
retaining the additional item by the one or more sets of retention elements corresponding to the selected subset of deployable support elements.

10. The method of claim 7, wherein the manipulator comprises a plurality of deployable support elements including the first deployable support element, each deployable support element being configured to deploy or retract with respect to the frame, and each deployable support element comprising a respective set of additional retention elements; and further comprising:
selecting a subset of the deployable support elements based on an item weight of an additional item, such that a combined load-bearing capacity of the subset of the deployable support elements meets or exceeds the item weight;
selectively deploying the subset of the deployable support elements; and
retaining the additional item by the one or more sets of retention elements corresponding to the selected subset of deployable support elements.

11. A system for handling inventory in an inventory management facility, the system comprising:
a manipulator comprising:
a frame;
a first deployable support element connected with the frame by a first actuator, the first deployable support element comprising a first set of retention elements configured to retain an item; and
a second support element connected with the frame and comprising a second set retention elements configured to retain the item, wherein the manipulator is configurable between a first configuration in which the first deployable support element can contact and retain the item by the first set of retention elements without contact between the second support element and the item, and a second configuration in which the first deployable support element and second support element can contact and retain the item together by the first and second sets of retention elements;
a robotic actuator connected with the frame and configured to move the frame in order to cause the manipulator to contact the item;
an imaging device that generates image data of the item and an environment surrounding the item; and
a controller comprising at least one processor and memory containing nontransitory executable instructions that, when executed by the processor, cause the controller to at least:
receive an instruction to contact and retain the item;
receive image data generated by the imaging device of the item and the environment surrounding the item;
determine whether a contact area of the item is clear of obstructions based on the image data;
cause the manipulator to configure to one of the first or second configurations based a determination, from the image data, that that the contact area is sufficiently clear of obstructions to accommodate the first deployable support element adjacent the item in the first configuration but not sufficiently clear of obstructions to accommodate the second support element adjacent the item in the second configuration;
cause the robotic actuator to displace the manipulator to bring the first set of retention elements into contact with the item without the manipulator colliding with elements of the environment; and
cause the manipulator to retain the item by the first set of retention elements.

12. The system of claim 11, wherein the controller is configured to:
determine, based on the received image data, that a side surface of the item is available for contact by the manipulator;
cause displacement and rotation of the manipulator to bring the manipulator into contact with the item at the side surface of the item in response to the determination that the side surface of the item is available.

13. The system of claim 11, further comprising a force sensor connected with one of the frame or the robotic actuator near an interface between the frame and the robotic actuator, wherein the controller is further configured to:
cause the robotic actuator to lift the item by the manipulator; and
detect at least one of a load and a torque based an output of the force sensor.

14. The system of claim 11, wherein the controller is further configured to:
cause the robotic actuator to displace the item from a first location to a second location while the item is retained by the manipulator; and
cause the manipulator to release the item at the second location.

15. The system of claim 11, wherein at least one retention element of the first set of retention elements has a larger gripping area than each element of the second set of retention elements.

16. The system of claim 11, further comprising:
a plurality of deployable support elements including the first deployable support element, each respective deployable support element of the plurality of deployable support elements being connected with the frame by a respective actuator of a plurality of actuators, and each deployable support element comprising a respective additional set of retention elements, wherein:
the manipulator is further configurable to one or more intermediate configurations in which at least two of the deployable support elements are deployed in alignment with the first deployable support element.

17. The system of claim 11, wherein the first set of retention elements and second set of retention elements comprise vacuum cups pneumatically connected with at least one vacuum source.

18. The system of claim 17, wherein the first and second sets of retention elements are separately connected with the at least one vacuum source such that negative pressure from the vacuum source can be independently applied to the first set of retention elements and the second set of retention elements.

* * * * *

UNITED STATES PATENT AND TRADEMARK OFFICE
CERTIFICATE OF CORRECTION

Page 1 of 1

PATENT NO. : 10,902,377 B2
APPLICATION NO. : 15/879132
DATED : January 26, 2021
INVENTOR(S) : Sean Murphy et al.

It is certified that error appears in the above-identified patent and that said Letters Patent is hereby corrected as shown below:

In the Claims

Claim 7, Column 17, Line 4:
Delete "tion, the first by the first set of retention elements but"
Insert -- tion, the first item by the first set of retention elements but --

Claim 11, Column 18, Line 44:
Delete "second configurations based a determination, from the"
Insert -- second configurations based on a determination, from the --

Claim 11, Column 18, Line 45:
Delete "image data that that contact area is sufficiently clear"
Insert -- image data that the contact area is sufficiently clear --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*